US010339494B2

(12) United States Patent
Bostick et al.

(10) Patent No.: US 10,339,494 B2
(45) Date of Patent: Jul. 2, 2019

(54) EVENT MANAGEMENT USING NATURAL LANGUAGE PROCESSING (71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/754,853

(22) Filed: Jun. 30, 2015

(65) Prior Publication Data

US 2017/0004439 A1   Jan. 5, 2017

(51) Int. Cl.
*G06F 17/30* (2006.01)
*G06Q 10/08* (2012.01)
*G06F 17/27* (2006.01)

(52) U.S. Cl.
CPC ....... *G06Q 10/087* (2013.01); *G06F 17/2785* (2013.01)

(58) Field of Classification Search
CPC ................... G06Q 30/02; G06Q 10/1093
See application file for complete search history.

(56) References Cited

U.S. PATENT DOCUMENTS

2008/0281725 A1* 11/2008 Greer .................. G06Q 20/203
                                                                  705/22
2009/0150193 A1*  6/2009 Hong ..................... G06Q 10/02
                                                                   705/5

(Continued)

FOREIGN PATENT DOCUMENTS

EP          2747013 A1    6/2014
WO     2001037113 A2    5/2001

OTHER PUBLICATIONS

Rodriguez-Cano et al., Event Invitations in Privacy-Preserving DOSNs Formalization and Protocol Design, K. Bernsmed and S. Fischer-Hübner (Eds.): NordSec 2014, LNCS 8788, pp. 291-292, DOI: 10.1007/978-3-319-11599-3, Springer International Publishing Switzerland, 2014.

(Continued)

*Primary Examiner* — Talia F Crawley
(74) *Attorney, Agent, or Firm* — Garg Law Firm, PLLC; Christopher K. McLane (57) ABSTRACT

In an embodiment, preference information, corresponding to a first invitee from an invitees list for an event and permission by the first invitee to obtain the preference information from a data source is received. The preference information is usable to determine a sentiment of the first invitee towards an aspect of the event. The information about the first invitee is collected from the data source. A sentiment analysis is performed using Natural Language Processing (NLP), on the information, producing the preference information of the first invitee. the preference information of the first invitee is aggregated with preference information of a second invitee in the invitee list to form an aggregated preference. A list of items needed to satisfy the aggregated preference is created.

13 Claims, 5 Drawing Sheets

(56) References Cited

U.S. PATENT DOCUMENTS

| | | | |
|---|---|---|---|
| 2010/0312650 A1* | 12/2010 | Pinckney | G06Q 30/0269 705/14.66 |
| 2010/0312724 A1* | 12/2010 | Pinckney | G06Q 30/02 706/11 |
| 2011/0258125 A1 | 10/2011 | Iyer | |
| 2011/0302117 A1* | 12/2011 | Pinckney | G06Q 30/02 706/12 |
| 2011/0307478 A1* | 12/2011 | Pinckney | G06Q 30/02 707/724 |
| 2012/0136689 A1 | 5/2012 | Ickman et al. | |
| 2012/0239683 A1 | 9/2012 | Starkman | |
| 2013/0073435 A1* | 3/2013 | Yankovich | G06Q 30/06 705/27.2 |
| 2013/0311464 A1* | 11/2013 | Nix | G06F 16/4387 707/736 |
| 2014/0095597 A1 | 4/2014 | McNeil et al. | |
| 2014/0108333 A1 | 4/2014 | Jain et al. | |
| 2014/0278676 A1* | 9/2014 | Burka | G06Q 10/1093 705/7.19 |
| 2014/0280359 A1* | 9/2014 | Baecklund | G06Q 30/02 707/798 |
| 2015/0026007 A1* | 1/2015 | Mangalvedkar | G06Q 30/0633 705/26.8 |
| 2015/0149298 A1* | 5/2015 | Tapley | G06Q 30/0633 705/14.66 |

OTHER PUBLICATIONS

IBM, A Calendar & Scheduing Computer Application Sub-System that incorporates a naturally expanding and correcting process of event invitations, May 26, 2008.

Anonymous, System for User Specified Rules and Calendar Integration to Control Automated Response to Social Networking Event Invitations, Jun. 29, 2011.

Anonymous, System and method for social event acceptance, Aug. 31, 2013.

Rodrigues-Cano, Privacy and Identity Management for the Future Internet in the Age of Globalisation, 9th IFIP WG 9.2, 9.5, 9.6/11.7, 11.4, 11.6/SIG 9.2.2 International Summer School Patras, Greece, Sep. 7-12, 2014.

Rodriguez-Cano et al., Event Invitations in Privacy-Preserving DOSNs Formalization and Protocol Design, IFIP International Federation for Information Processing 2015, J. Camenisch et al. (Eds.): Privacy and Identity 2014, IFIP AICT 457, pp. 185-200, 2015.

* cited by examiner

EVENT MANAGEMENT USING NATURAL LANGUAGE PROCESSING

TECHNICAL FIELD

The present invention relates generally to a method, system, and computer program product for planning a social event. More particularly, the present invention relates to a method, system, and computer program product for sentiment analysis and inventory based event planning.

BACKGROUND

Natural language processing (NLP) is a technique that facilitates exchange of information between humans and data processing systems. For example, one branch of NLP pertains to transforming human readable content, such as unstructured data, into machine usable data. For example, NLP engines are presently usable to accept input content such as a newspaper article or a whitepaper, and produce structured data, such as an outline of the input content, most significant and least significant parts, a subject, a reference, dependencies within the content, and the like, from the given content.

Social media comprises any medium, network, channel, or technology for facilitating communication between a number of individuals and/or entities (users). Some common examples of social media are Facebook or Twitter, each of which facilitates communications in a variety of forms between large numbers of users (Facebook is a trademark of Facebook, Inc. in the United States and in other countries. Twitter is a trademark of Twitter Inc. in the United States and in other countries.) Social media, such as Facebook or Twitter allow users to interact with one another individually, in a group, according to common interests, casually or in response to an event or occurrence, and generally for any reason or no reason at all.

Some other examples of social media are websites or data sources associated with radio stations, news channels, magazines, publications, blogs, and sources or disseminators of news or information. Some more examples of social media are websites or repositories associated with specific industries, interest groups, action groups, committees, organizations, teams, or other associations of users.

Data from social media comprises unidirectional messages, or bi-directional or broadcast communications in a variety of languages and forms. Such communications in the social media data can include proprietary conversational styles, slangs or acronyms, urban phrases in a given context, formalized writing or publication, and other structured or unstructured data.

Social media stores information about its users, including their preferences and contributions or interactions with the social media. For example, a user of a social media website has a profile, which includes a set of attributes. The profile attributes in a user profile capture a variety of information about the user, including but not limited to the user's name, location, address, marital status, nationality, age, gender, interests, likes, dislikes, preferences, and so on.

A user's contributions or interactions with the social media can include any type or size of data. For example, a user can post text, pictures, videos, links, or combinations of these and other forms of information to a social media website. Furthermore, such information can be posted in any order, at any time, for any reason, and with or without any context.

Event planning is the process of arranging social events, such as a gathering of invited guests—the invitees. An invitee may, but need not necessarily be, a social media user. An invitee may, but need not necessarily store information, or cause information about the invitee to be stored at another information source.

SUMMARY

The illustrative embodiments provide a method, system, and computer program product for sentiment analysis and inventory based social event planning. An embodiment includes a method for social event planning. The embodiment receives, corresponding to a first invitee from an invitees list for a social event and a permission by the first invitee to obtain preference information from a data source, the preference information being usable to determine a sentiment of the first invitee towards an aspect of the social event. The embodiment collects, from the data source, information about the first invitee. The embodiment performs, by using a processor and a memory, using Natural Language Processing (NLP), a sentiment analysis on the information about the first invitee, the sentiment analysis producing the preference information of the first invitee. The embodiment aggregates the preference information of the first invitee with preference information of a second invitee in the invitee list to form an aggregated preference. The embodiment creates a list of items needed to satisfy the aggregated preference.

Another embodiment includes a computer program product for social event planning, the computer program product comprising one or more computer-readable storage devices, and program instructions stored on at least one of the one or more storage devices.

Another embodiment includes a computer system for social event planning, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Only as an example, and without implying any limitation thereto, the illustrative embodiments are described using certain social media sources and other information sources. Those of ordinary skill in the art will be able to adapt an embodiment to operate with other similarly purposed sources of data, and the same are contemplated within the scope of the illustrative embodiments.

Consider, for example, a get-together as a planned event. The event is planned using any of the existing event planning applications, tools, websites, or mobile apps (collectively, hereinafter, "event management tool"). The event management tool creates a list of invitees, such as by enabling a host user to create an invitee-list using a user interface of the event management tool.

Each invitee may have differing preferences on the food they like, dietary restrictions, drink preferences, music likings, and other preferences. A common problem with event planning is that the host of the event has to know these preferences of the invitees so that the event is to the invitees' satisfaction.

The illustrative embodiments recognize that presently, event management tools provide no feature or method to learn the preferences of the invitees automatically. For example, some event management tools require the host user to guess or input one or more preferences of one or more invitees. Some other event management tools ask the invitees to input their preferences with their invitation acceptance.

The illustrative embodiments recognize that such a manner of planning an event according to invitees' preferences is cumbersome, onerous, and error-prone. A solution for automatically determining the invitees' preferences, and determining how to accommodate those preferences given the resources available to the host, is therefore desirable.

The inventors are unaware of any general recognition of these problems by fellow practitioners. The illustrative embodiments used to describe the invention generally address and solve the above-described problems and other problems related to determining invitee preferences for event planning. The illustrative embodiments provide a method, system, and computer program product for sentiment analysis and inventory based event planning.

The illustrative embodiments recognize that many invitees are social media members. Accordingly, the illustrative embodiments recognize that an invitee is likely to have configured or expressed at least some of the preferences on a source of social media information. For example, an invitee may expressly indicate a style of music preference in a social media profile of the invitee, and may state a food allergy in a social media interaction with others.

The illustrative embodiments further recognize that some invitees are also participants in other types of information sources. For example, an invitee may log their beverage preferences at Untappd.com, their food preferences in Foodie.com, and their music preferences in Spotify.com (Untappd.com is a website and Untappd is a trademark owned by Untappd LLC. Foodie.com is a website and trademark owned by Mode Media Corporation. Spotify.com is a website and Spotify is a trademark owned by Spotify USA Inc.)

Generally, within the scope of the illustrative embodiments, a social media source is data source that can provide social media information about a preference an invitee, and an information source is any other type of data source that can provide information about a preference of an invitee. A preference of an invitee is any preference that chooses one or more choices from a plurality of choices available for an aspect of a planned event. Such aspects of the planned events include but are not limited to food choices, drinks choices, music styles or tracks choices, clothing styles choices, event theme choices, event topic or subject choices, and the like.

An embodiment creates and maintains a list of social media sources and other information sources (hereinafter, the source list). The embodiment also creates and maintains a profile for an invitee. In one embodiment, the profile stores one or more permissions from the invitee to access one or more corresponding social media source or other information source in the source list and obtain the invitee's information.

An embodiment collects the invitees' information from one or more such permitted sources. Note that the invitee's information from such sources may not directly be usable as the invitee's preference.

When a preference of the invitee is not expressly indicated in the collected information, the embodiment submits the collected information to an NLP engine for sentiment analysis. Sentiment analysis is a type of NLP analytics, which, given a collection of information, identifies an underlying inclination or distancing, aversion or attraction, like or dislike, and other similar sentiments towards a given subject in that information.

For example, NLP of Facebook status updates of an invitee may indicate that the invitee suffers from high cholesterol and is on a restricted low-fat diet. Similarly, in another example, NLP of tweeted messages may indicate that an invitee is vegetarian. As another example, an analysis of beverages checked on Untappd may indicate that an invitee enjoys cola and juices, and an analysis of favorite artists listed in Spotify may indicate that an invitee enjoys Classic Rock music.

For the invitees who do participate in a source in the source list, and who have permitted access to their information at such sources, the embodiment identifies the invitees' preferences for various aspects of the event by collecting the invitees' information from the permitted sources, performing sentiment analysis on the collected information. For those invitees who do not participate in any source in the source list, or who have not permitted access to the sources in which they do participate, the embodiment attempts to collect information about the invitees that is publicly available from sources in the source list. The embodiment can also optionally collect similar publicly available information about those invitees whose profiles include permissions to access some sources in the source list.

The embodiment attempts to identify an invitee's preference from such publicly available information as well. The publicly available information collected in this manner is also subjected to sentiment analysis.

Given a set of invitees, an invitee can have zero to n preferences, some preferences about a particular event aspect may be common to a subset of the invitees, a preference about a particular event aspect may be unique to an invitee, or some combination of these and other variations of the preferences. Once a set of preferences is known about the set of invitees, the embodiment assigns confidence values to the various preferences about each event aspect that is under consideration. For example, the embodiment may indicate 73 percent confidence that most invitees enjoy Vegetarian Indian cuisine, 54 percent confidence that at least half of all invitees enjoy seafood, 85 percent confidence that most invitees enjoy cola, 95 percent confidence that all soda drinkers enjoy fruit juices, and 69 percent confidence that all invitees enjoy Classic Rock.

Using a user interface, the embodiment presents the host user with a list of recommendations based on the analysis and confidence ratings. The host selects one or more of the recommendations. For example, given the above example preferences and confidence ratings, the embodiment recommends a menu that contains a mixture of seafood, and vegetarian Indian cuisine, a case of cola and two jugs of orange juice, and Classic Rock as the musical preference for the event. The host may select all, some, or none of the recommendations.

Based on the confidence rated preferences and the selections made by the host, the embodiment assists the host with one or more of shopping lists, music playlists, and the like. For example, an embodiment can connect to a user's home network to determine which food and drink items are already in stock in the house and create a shopping list for only the remaining items. For example, the embodiment computes a present inventory of food items in storage and in a refrigerator. The embodiment compares the food and drink items needed for the event with the computed inventory. Based on the comparison, the embodiment creates a shopping list of items not available in the inventory and likely to be needed for the event. Optionally, the embodiment can also compute and add non-food items, such as dish detergent and plastic beverage cups, to the shopping list.

As another example, the embodiment can connect to a music subscription service and send instructions to create a customized playlist based on the determined musical preferences of the invitees. For example, the embodiment can send instructions to Spotify to create a playlist for Classic Rock style music based on the music preference with the highest confidence rating.

A method of an embodiment described herein, when implemented to execute on a device or data processing system, comprises substantial advancement of the functionality of that device or data processing system in automated invitee-preference determination for event planning. For example, where prior-art is limited to asking each invitee his or her preference, an embodiment automatically analyzes social media and other information sources to determine and confidence-rate the preferences of the event invitees. The embodiment further creates one or more lists to assist in planning and successful execution of the event in satisfaction of the invitees' preferences. Operating in a manner described herein, an embodiment significantly reduces the effort on the part of the event host, and improves the satisfaction of the invitees from the event. Such manner of extracting sentiments and preferences is unavailable in presently available devices or data processing systems. Thus, a substantial advancement of such devices or data processing systems by executing a method of an embodiment improves event planning operations.

The illustrative embodiments are described with respect to certain even planning tools, events, aspects of events, preferences, social media sources, other information sources, collected information, NLP analyses, preferences, confidence ratings, recommendations, user interfaces, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
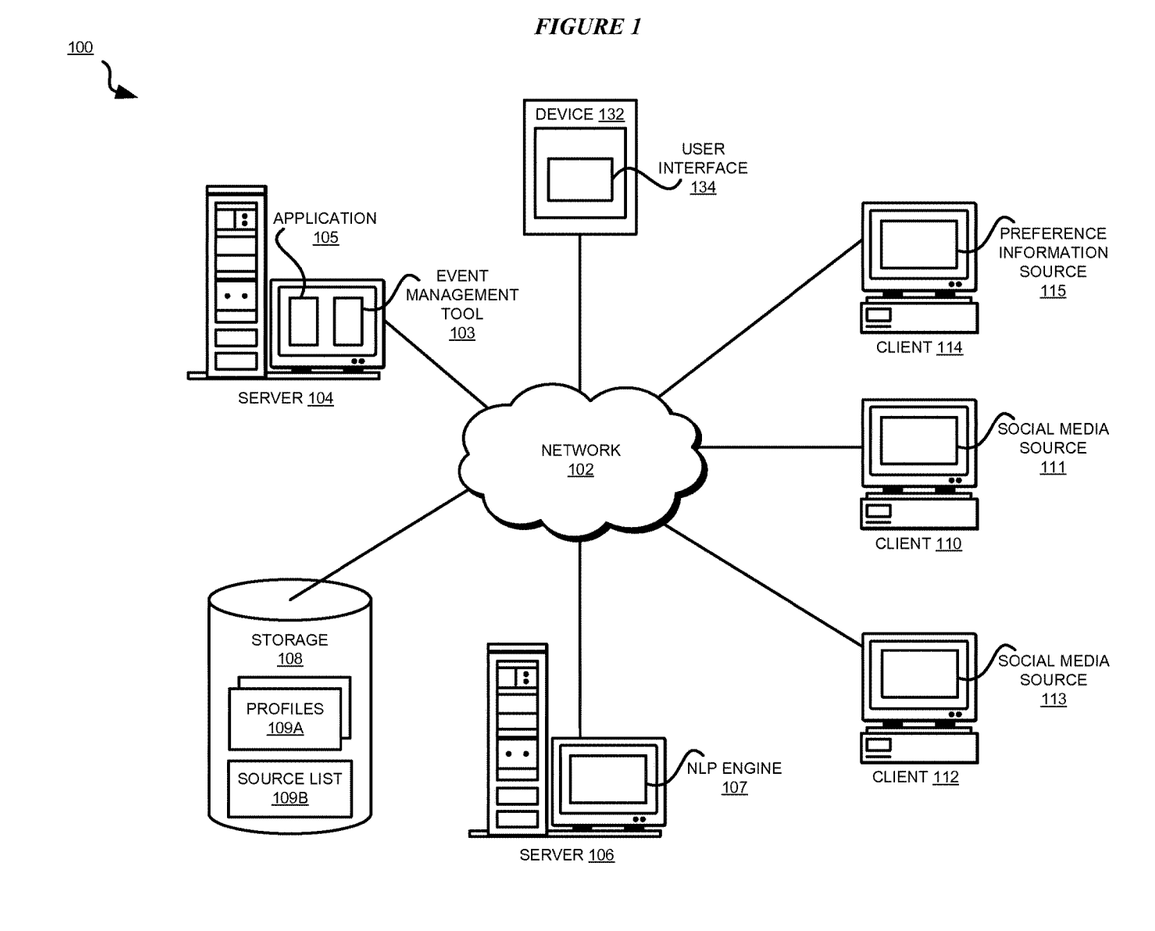
FIG. 1 depicts a block diagram of a network of data processing systems in which illustrative embodiments may be implemented.
Figure 2:
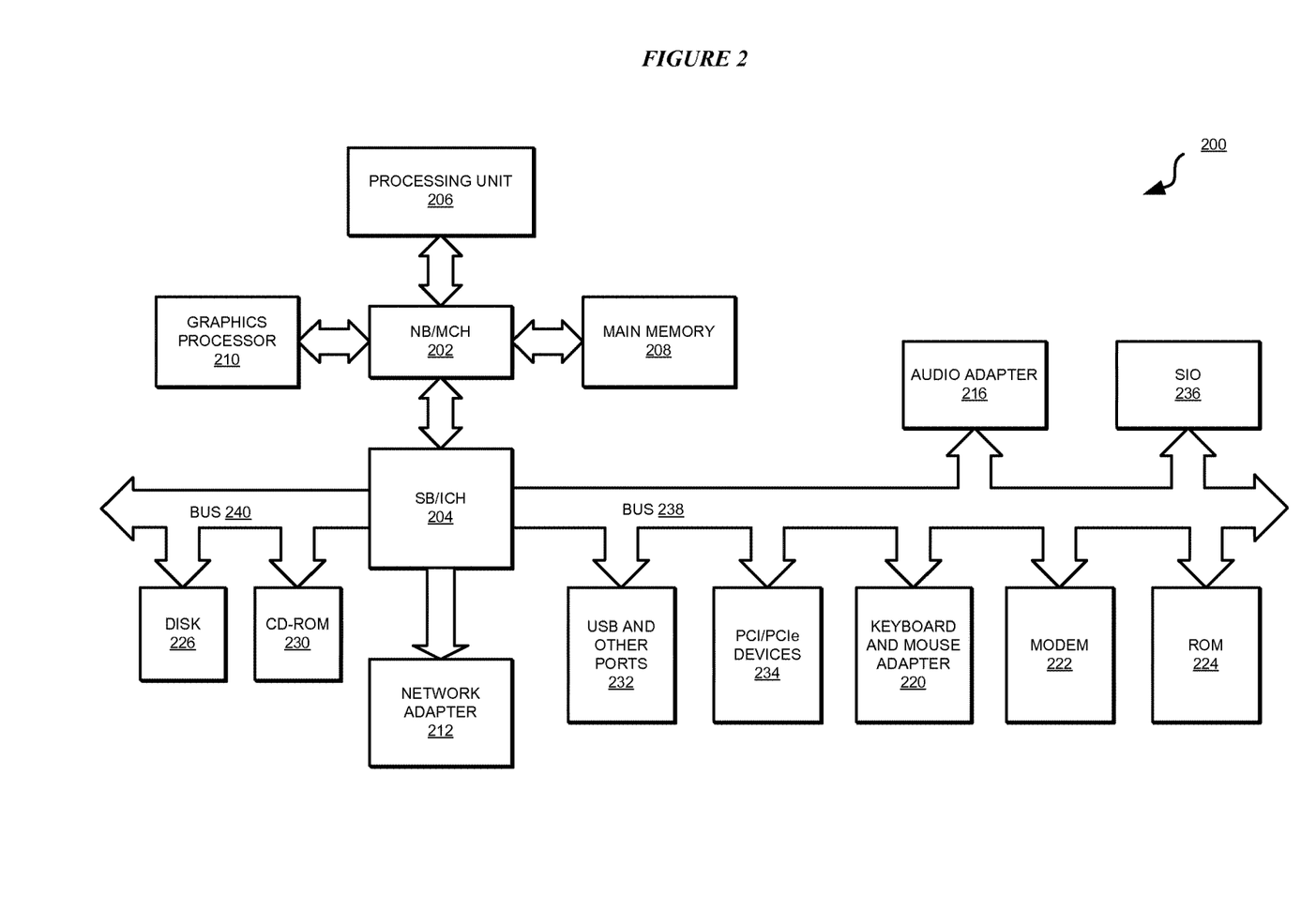
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device on which a user interface 134 can be presented as described herein. For example, device 132 can take the form of a smartphone, a tablet computer, a laptop computer, client 110 in a stationary or a portable form, a wearable computing device, or any other suitable device that can be configured with user interface 134. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Event management tool 103 is an existing event management tool usable for planning an event as described herein. For example, in an existing event planning process, event management tool 103 is configured to create and manage a list of invitees. Application 105 operates in conjunction with event management tool 103 and uses NLP engine 107 as described herein. Application 105 uses profiles 109A, which include one or more profiles of an invitee on the invitee list. Source list 109B includes sources of information about the invitees, such as social media sources and other information sources, to which application 105 has access. Social media sources 111 and 113 are example sources listed in source list 109B. Information source 115 is an example of other sources, such as Spotify, that are also included in source list 109B.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
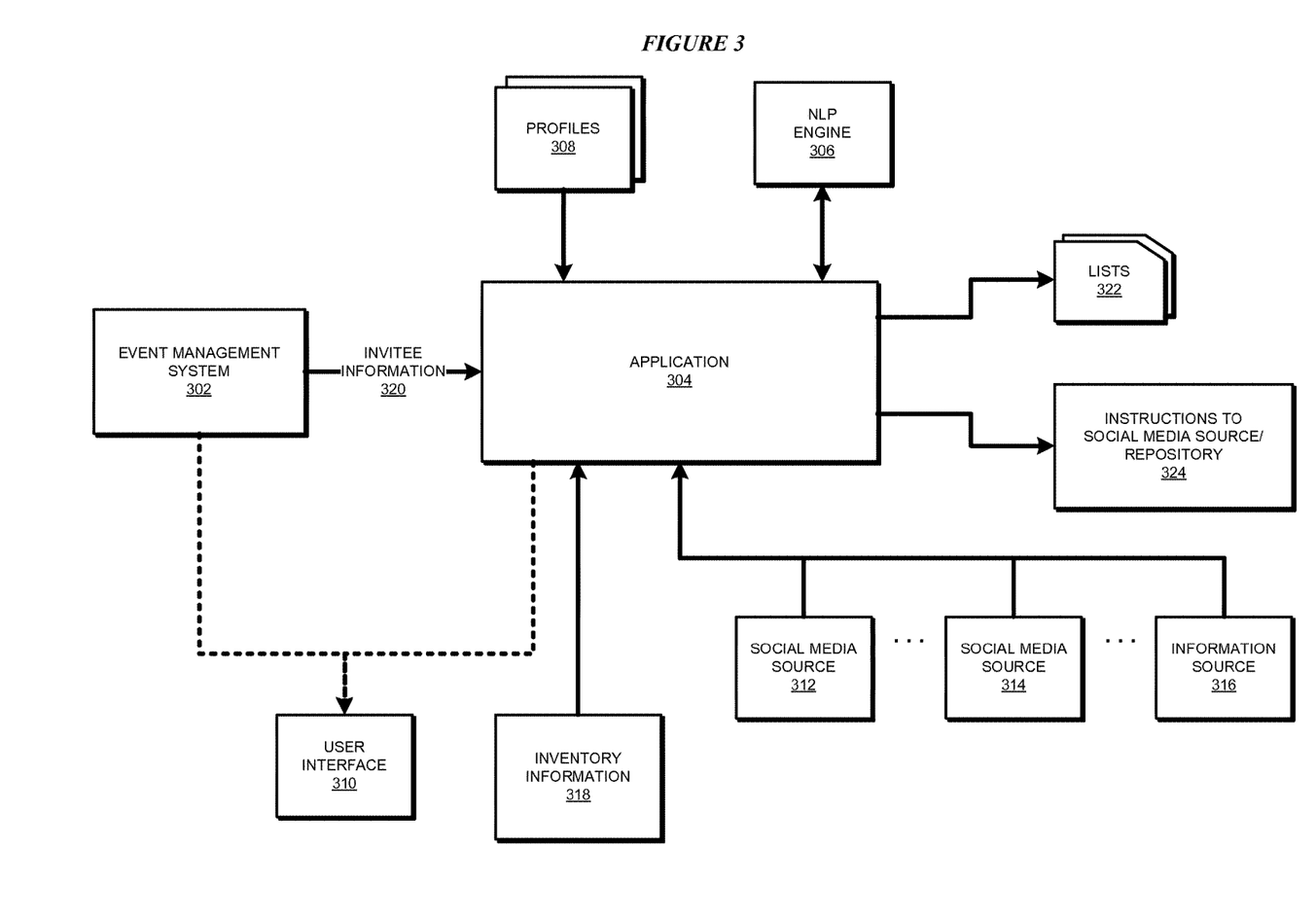
FIG. 3 depicts a block diagram of an example configuration for sentiment analysis and inventory based event planning in accordance with an illustrative embodiment.

With reference to FIG. 3, this figure depicts a block diagram of an example configuration for sentiment analysis and inventory based event planning in accordance with an illustrative embodiment.

Event management tool 302 is an example of event management tool 103, application 304 is an example of application 105, NLP engine 306 is an example of NLP engine 107, profiles 308 are examples of profiles 109A, and user interface 310 is an example of user interface 134, in FIG. 1.

Social media sources 312 and 314 are any number of social media sources in the manner of social media sources 111 or 113 in FIG. 1. Any number of types of information source 316 can operate with application 304 in the manner of information source 115 in FIG. 1. Sources 314, 316, and 318 exist in source list 109B in FIG. 1 and are therefore accessible to application 304.

Inventory information 318 is information about available quantities of things needed for the event planned using event management tool 302. Inventory information 318 is compiled in a manner described herein and other similarly purposed interactions with home-automation.

Event management tool 302 sends invitee information 320 to application 304. Invitee information 320 includes a list of invitees for an event being planned on event management tool 302.

Application 304 determines whether an invitee in invitee information 320 has permitted access to their preference information from one or more sources 312, 314, and 318, according to one or more profiles 308. When an invitee in invitee information 320 has not permitted access to their preference information, or in addition to a permitted access in a profile 308, application 304 accesses one or more sources 312, 314, and 318, to determine if information about the invitee is publicly available from those sources and usable to ascertain an event aspect preference of the invitee.

Application 304 collects information usable to ascertain a preference of an invitee about an event aspect, such as food, drinks, or music. Application 304 submits the collected information to NLP engine 306. NLP engine 306 performs sentiment analysis on the supplied information, and returns the results of the sentiment analysis to application 304.

In one embodiment, the NLP engine returns the results with weights associated therewith. A weight associated with a result is indicative of a confidence of the NLP engine in the particular result based on the information from which the result was derived.

Application 304 analyzes the preferences contained in the results that are returned from NLP engine 306. According to the analysis of the preferences, application 304 identifies groups of invitees with common preferences. Using the grouping of invitees and any weights associated with the preference results corresponding to the group members, application 304 computes a confidence rating for the common preference.

In one embodiment, application 304 creates a group of invitees only when a number of members of the group exceeds a threshold number of invitees. In another embodiment, application 304 creates a group of invitees only when an average weight of the common preference of the members exceeds a threshold weight. In another embodiment, application 304 creates a group of invitees only when a number of members of the group exceeds a threshold number of invitees, and an average weight of the common preference of the members exceeds a threshold weight.

These examples of manner of forming groups by evaluating the number of members and statistical analysis of weights are not intended to be limiting. From this disclosure, those of ordinary skill in the art will be able to conceive many other manners of grouping invitees and the same are contemplated within the scope of the illustrative embodiments.

Event management tool 302 presents the event information and invitee information 320 on user interface 310. Application 304 presents the grouping of invitees, confidence ratings of preferences, or both on user interface 310. The host of the event can then select on the user interface those preferences which the host wants to accommodate for the event. In one embodiment, application 304 automatically selects the preferences whose confidence rating exceeds a threshold as the preferences that are to be accommodated for the event.

Based on the selected preferences and the group sizes associated with the selected preferences, application 304 uses inventory information 318 to determine a set of supplies needed for the event, a subset of those supplies that exist in the inventory according to inventory information 318, and a subset of those supplies that have to be procured for the event. Application 304 outputs all or part of the subset of those supplies that have to be procured as one or more lists 322. For example, a list in lists 322 can be a shopping list from one store or one route, and another list in lists 322 can be a shopping list from another store, another route, or for a different time.

A selected preference may pertain to an event aspect that can be satisfied via data. For example, a music style preference can be satisfied via a playlist of streaming or downloadable music from a social media source or another source, such as a music repository. In such cases, application 304 constructs and sends to an appropriate source instructions 324. Instructions 324 are usable to construct, for example, the playlist at the source, download music from the source, schedule a playback from the source, and the like.

Figure 4:
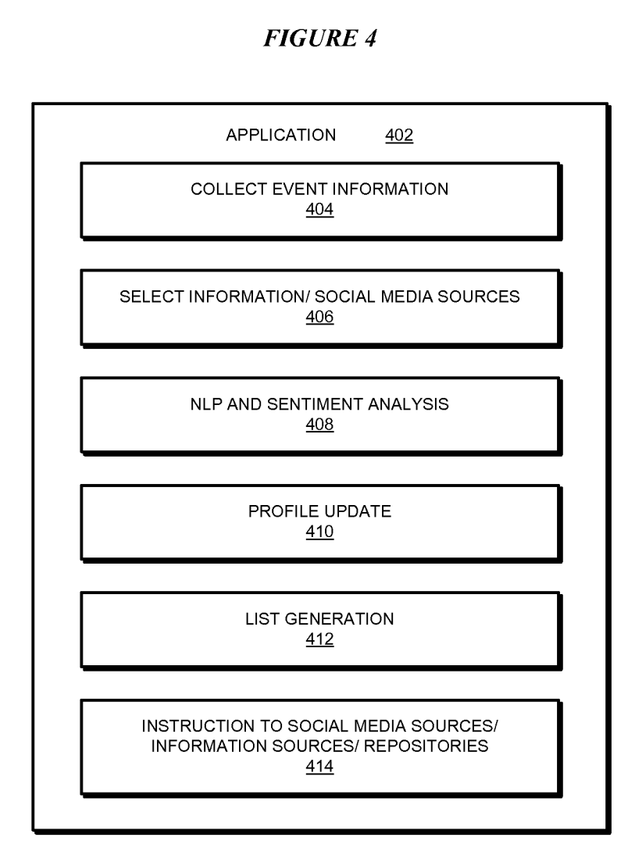
FIG. 4 depicts a block diagram of an application for sentiment analysis and inventory based event planning in accordance with an illustrative embodiment.

With reference to FIG. 4, this figure depicts a block diagram of an application for sentiment analysis and inventory based event planning in accordance with an illustrative embodiment. Application 402 is an example of application 304 in FIG. 3.

Component 404 collects the invitees information and other implementation-dependent information from an event management tool, such as event management tool 302 in FIG. 3. Component 404 identifies any profiles that might be available for one or more invitees on the invitees list.

Component 406 selects the sources, such as social media sources, other information sources, or a combination thereof, that are permitted by an invitee according to a profile. Component 406 connects with the selected sources and collects permitted and/or public information about the invitee(s).

Component 408 communicates with an NLP engine, such as NLP engine 306 in FIG. 3. Component 408 provides the information collected by component 406 to the NLP engine. Component 408 receives from the NLP engine the results of sentiment analysis based on the provided information. Component 408 groups the invitees according to common preferences, computes and assigns confidence ratings to the common preferences, or a combination thereof.

When, for an invitee, the results of sentiment analysis indicate a preference, or a preference with greater than a threshold weight, as the case may be, component 410 updates a profile of the invitee. Specifically according to one embodiment, component 410 adds or updates a known preference information in the invitee's profile. By saving such information in the invitee profiles, component 410 can reduce the computational workload and network traffic while planning another event with the same invitee.

Component 412 generates one or more lists 322 in FIG. 3. In one embodiment, component 412 receives or determines the confidence-rated preferences selected for accommodation, obtains inventory information 318, and produces a list in lists 322.

Component 414 generates instructions 324 in FIG. 3. In one embodiment, component 414 determines that a preference that has been selected for accommodation can be satisfied with data from a source. Accordingly, component 414 generates the instructions to operate or configure the source to obtain the data that satisfies the selected preference.

The example configuration in FIG. 4 is not intended to be limiting. From this disclosure, those of ordinary skill in the art will be able to conceive many other configurations for a similar purpose and the same are contemplated within the scope of the illustrative embodiments.

Figure 5:
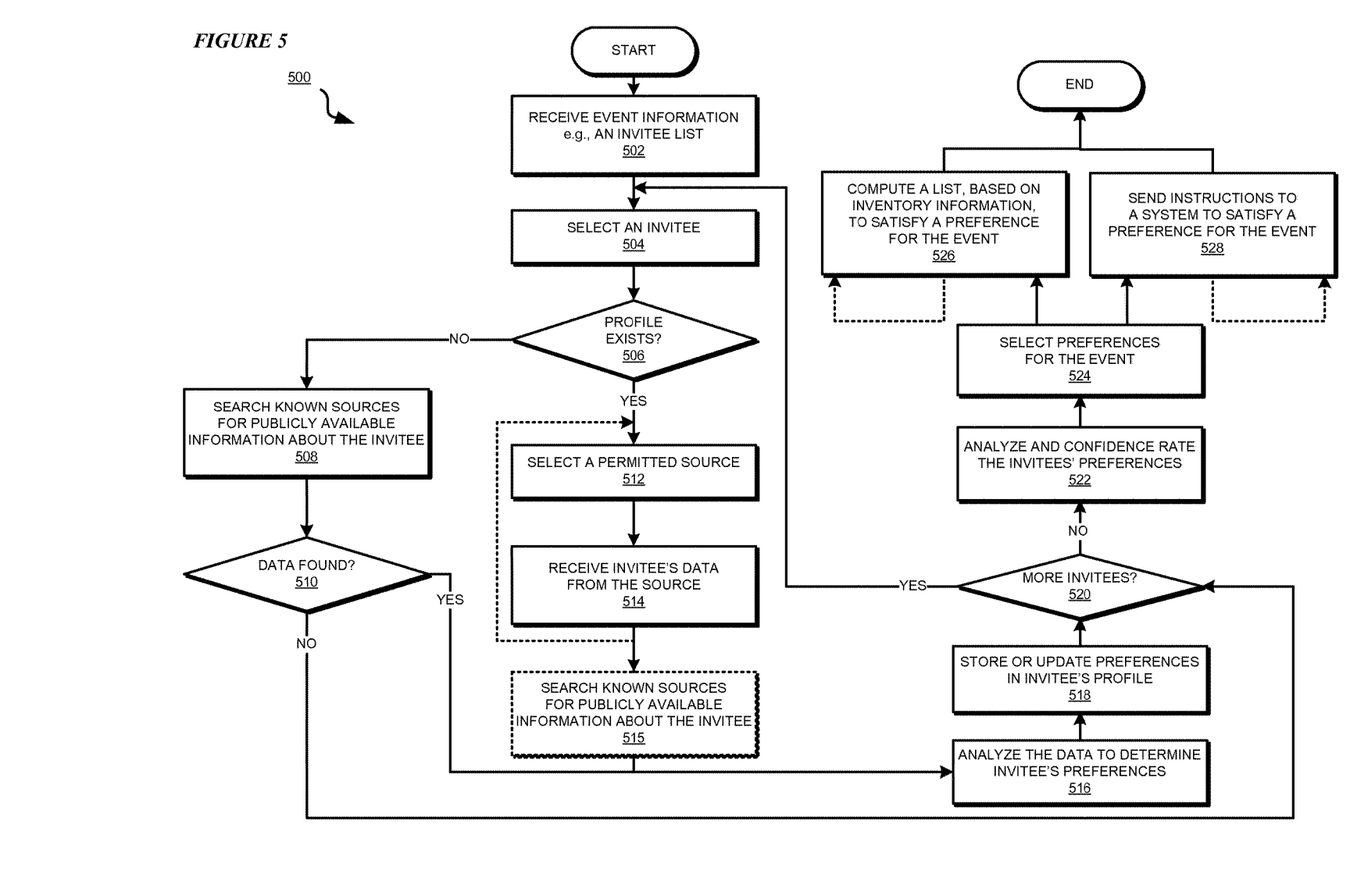
FIG. 5 depicts a flowchart of an example process for sentiment analysis and inventory based event planning in accordance with an illustrative embodiment.

With reference to FIG. 5, this figure depicts a flowchart of an example process for sentiment analysis and inventory based event planning in accordance with an illustrative embodiment. Process 500 can be implemented in application 402 in FIG. 4.

The application receives event information, e.g., a list of invitees for an event (block 502). The application selects an invitee (block 504).

For the selected invitee, the application determines whether a profile exists in a repository (block 506). The operation of the profile and the contents thereof are described elsewhere in this disclosure.

If a profile does not exists for the selected invitee ("No" path of block 506), the application searches known sources from a source list for publicly available information about the invitee (block 508). The application determines if any such publicly available data has been found as a result of the search of block 508 (block 510).

If no data is found ("No" path of block 510), the application proceeds to block 520. If data is found ("Yes" path of block 510), the application proceeds to block 516.

If a profile does exists for the selected invitee ("Yes" path of block 506), the application selects a permitted source from the profile (block 512). The application receives invitee's data from the selected permitted source (block 514). The application repeats blocks 512 and 514 for as many sources as may be permitted in one or more profiles associated with the invitee. Optionally, the application also searches known sources from a source list for publicly available information about the invitee (block 515).

The application analyzes the data collected as a result of the searches in block 508, 514, 515, or some combination thereof (block 516). Specifically, the application uses an NLP engine to perform sentiment analysis on the collected data to determine the invitee's preferences. In one embodiment (not shown), the sentiment analysis is deferred until all available data about all invitees has been collected in this manner.

The application receives the results of the sentiment analysis of block 516 and stores or updates a profile of the invitee (block 518). The application determines whether more invitees remain to be processed in this manner (block 520).

If more invitees remain to be processed in this manner ("Yes" path of block 520), the application returns to block 504 to select another invitee from the invitee list. If no more invitees remain to be processed in this manner ("No" path of block 520), the application analyzes and confidence-rates the invitees' preferences (block 522).

The application selects the preferences for the event (block 524). For example, in one embodiment, the application receives a user input from the host user, where the input selects some or all of the confidence-rated preferences of block 522. In another example embodiment, the application automatically selects some or all of the confidence-rated preferences of block 522.

Depending upon the selected preferences, the application executes block 526, block 528, or both. For example, based on inventory information available to the application, the application computes a list of items, such as a shopping list, that are needed to satisfy a selected preference for the event (block 526). The application may repeat block 526 for as many lists as may have to be created given the preference selection.

Based on the data needs of a selected preference, the application generates instructions, such as instructions to a music source, that are sufficient to obtain the data needed to satisfy the selected preference for the event (block 528). The application may repeat block 528 for as many instructions to as many sources as may be needed given the preference selection. The application ends process 500 thereafter.

Thus, a computer implemented method, system or apparatus, and computer program product are provided in the illustrative embodiments for sentiment analysis and inventory based event planning. Where an embodiment or a portion thereof is described with respect to a type of device, the computer implemented method, system or apparatus, the computer program product, or a portion thereof, are adapted or configured for use with a suitable and comparable manifestation of that type of device.

While the embodiments are described for an event planning flow starting from an invitees list and ending at the generation of a shopping list or instructions, such implementation is not intended to be limiting on the illustrative embodiments. For example, an embodiment can be configured to operate in reverse, to wit, starting from a list of items and/or data available to the host, and ending in the selection of a set of host's social media friends who can be invited given the available items or data. This and other such adaptations are contemplated within the scope of the illustrative embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving an invitees list from an event management tool;
receiving, corresponding to a first invitee from the invitees list for a social event and a permission by the first invitee to obtain preference information from a data source, the preference information being usable to determine a sentiment of the first invitee towards an aspect of the social event, wherein the permission is included in a first profile associated with the first invitee;
collecting, from the data source, information about the first invitee, wherein the information includes a social media post to a social media source by the first invitee;
performing, by using a processor and a memory, using Natural Language Processing (NLP), a sentiment analysis on the social media post of the first invitee, the sentiment analysis producing the preference information of the first invitee;
assigning a first confidence value to the preference information of the first invitee;
updating the first profile with the preference information of the first invitee responsive to the first confidence value exceeding a confidence value threshold;
determining whether a second profile is associated with the second invitee in the invitees list;
searching, responsive to the second profile not being associated with the second invitee, a social media data source selected from a list of a plurality of social media data sources to find publicly available information about the second invitee;
analyzing, responsive to the finding, the publicly available information using NLP to identify preference information of the second invitee corresponding to the social event aspect;
assigning a second confidence value to the preference information of the second invitee;
updating the second profile with the preference information of the second invitee responsive to the second confidence value exceeding the confidence value threshold;
aggregating the preference information of the first invitee with the preference information of the second invitee in the invitee list to form an aggregated preference;
assigning a confidence rating to the aggregated preference to form a confidence rated preference, wherein the confidence rating of the aggregated preference is computed using the first confidence value and the second confidence value;
selecting, responsive to the confidence rating exceeding a threshold confidence rating, from a set of confidence rated preferences, the confidence rated preference;
creating a group of invitees from the invitees list responsive to a number of members of the group exceeding a threshold number of invitees and the confidence rating of the aggregated preference exceeding the threshold confidence rating;
creating a list of items needed to satisfy the aggregated preference based upon the aggregated preference and the number of members of the group;
receiving, over a data network, from a home-automation enabled appliance, an inventory of available items currently stored at a location of the home-automation enable appliance;
comparing the list of items needed with the inventory;
producing a second list of items to be procured for the social event, wherein an item in the second list exists in the list of items needed but not in the inventory;
connecting to a music subscription service; and
sending instructions to the music subscription service to create a customized playlist based on the aggregated preference and schedule a playback of the customized playlist from the music subscription service, wherein the aggregated preference includes a music style preference having a highest confidence rating among music style preferences of the invitees.

2. The method of claim 1, further comprising:
determining that an item on the list of items needed is a data item;
identifying a source of the data item;
generating an instruction to obtain the data item from the source of the data item; and
sending the instruction to the source of the data item such that the data item will become available at the social event.

3. The method of claim 1, wherein the preference information of the first invitee and the preference information of the second invitee correspond to the social event aspect.

4. The method of claim 1, wherein the data source comprises a social media data source.

5. The method of claim 1, wherein the data source comprises an interest-based information source.

6. The method of claim 1, wherein the social event aspect comprises a choice of food served at the social event.

7. The method of claim 1, wherein the social event aspect comprises a choice of drinks served at the social event.

8. The method of claim 1, wherein the social event aspect comprises a choice of music played at the social event.

9. The method of claim 1, wherein the method is embodied in a computer program product comprising one or more computer-readable storage devices and computer-readable program instructions which are stored on the one or more computer-readable tangible storage devices and executed by one or more processors.

10. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

11. A computer program product comprising one or more computer-readable storage devices, and program instructions stored on at least one of the one or more storage devices, the stored program instructions comprising:
   program instructions to receive an invitees list from the event management tool;
   program instructions to receive, corresponding to a first invitee from the invitees list for a social event and a permission by the first invitee to obtain preference information from a data source, the preference information being usable to determine a sentiment of the first invitee towards an aspect of the social event, wherein the permission is included in a first profile associated with the first invitee;
   program instructions to collect, from the data source, information about the first invitee wherein the information includes a social media post to a social media source by the first invitee;
   program instructions to perform, by using a processor and a memory, using Natural Language Processing (NLP), a sentiment analysis on the social media post of the first invitee, the sentiment analysis producing the preference information of the first invitee;
   program instructions to assign a first confidence value to the preference information of the first invitee;
   program instructions to update the first profile with the preference information of the first invitee responsive to the first confidence value exceeding a confidence value threshold;
   program instructions to determine whether a second profile is associated with the second invitee in the invitees list;
   program instructions to search, responsive to the second profile not being associated with the second invitee, a social media data source selected from a list of a plurality of social media data sources to find publicly available information about the second invitee;
   program instructions to analyze, responsive to the finding, the publicly available information using NLP to identify preference information of the second invitee corresponding to the social event aspect;
   program instructions to assign a second confidence value to the preference information of the second invitee;
   program instructions to update the second profile with the preference information of the second invitee responsive to the second confidence value exceeding the confidence value threshold;
   program instructions to aggregate the preference information of the first invitee with the preference information of the second invitee in the invitee list to form an aggregated preference;
   program instructions to assign a confidence rating to the aggregated preference to form a confidence rated preference, wherein the confidence rating of the aggregated preference is computed using the first confidence value and the second confidence value;
   program instructions to select, responsive to the confidence rating exceeding a threshold confidence rating, from a set of confidence rated preferences, the confidence rated preference;
   program instructions to create a group of invitees from the invitees list responsive to a number of members of the group exceeding a threshold number of invitees and the confidence rating of the aggregated preference exceeding the threshold confidence rating;
   program instructions to create a list of items needed to satisfy the aggregated preference based upon the aggregated preference and the number of members of the group;
   program instructions to receive, over a data network, from a home-automation enabled appliance, an inventory of available items currently stored at a location of the home-automation enable appliance;
   program instructions to compare the list of items needed with the inventory;
   program instructions to produce a second list of items to be procured for the social event, wherein an item in the second list exists in the list of items needed but not in the inventory;
   program instructions to connect to a music subscription service; and
   program instructions to send instructions to the music subscription service to create a customized playlist based on the aggregated preference and schedule a playback of the customized playlist from the music subscription service, wherein the aggregated preference includes a music style preference having a highest confidence rating among music style preferences of the invitees.

12. The computer program product of claim 11, further comprising:
   program instructions to determine that an item on the list of items needed is a data item;
   program instructions to identify a source of the data item;
   program instructions to generate an instruction to obtain the data item from the source of the data item; and
   program instructions to send the instruction to the source of the data item such that the data item will become available at the social event.

13. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
   program instructions to receive an invitees list from the event management tool;
   program instructions to receive, corresponding to a first invitee from the invitees list for a social event and a permission by the first invitee to obtain preference information from a data source, the preference information being usable to determine a sentiment of the first invitee towards an aspect of the social event, wherein the permission is included in a first profile associated with the first invitee;

program instructions to collect, from the data source, information about the first invitee wherein the information includes a social media post to a social media source by the first invitee;

program instructions to perform, by using a processor and a memory, using Natural Language Processing (NLP), a sentiment analysis on the social media post of the first invitee, the sentiment analysis producing the preference information of the first invitee;

program instructions to assign a first confidence value to the preference information of the first invitee;

program instructions to update the first profile with the preference information of the first invitee responsive to the first confidence value exceeding a confidence value threshold;

program instructions to determine whether a second profile is associated with the second invitee in the invitees list;

program instructions to search, responsive to the second profile not being associated with the second invitee, a social media data source selected from a list of a plurality of social media data sources to find publicly available information about the second invitee;

program instructions to analyze, responsive to the finding, the publicly available information using NLP to identify preference information of the second invitee corresponding to the social event aspect;

program instructions to assign a second confidence value to the preference information of the second invitee;

program instructions to update the second profile with the preference information of the second invitee responsive to the second confidence value exceeding the confidence value threshold;

program instructions to aggregate the preference information of the first invitee with the preference information of the second invitee in the invitee list to form an aggregated preference;

program instructions to assign a confidence rating to the aggregated preference to form a confidence rated preference, wherein the confidence rating of the aggregated preference is computed using the first confidence value and the second confidence value;

program instructions to select, responsive to the confidence rating exceeding a threshold confidence rating, from a set of confidence rated preferences, the confidence rated preference;

program instructions to create a group of invitees from the invitees list responsive to a number of members of the group exceeding a threshold number of invitees and the confidence rating of the aggregated preference exceeding the threshold confidence rating;

program instructions to create a list of items needed to satisfy the aggregated preference based upon the aggregated preference and the number of members of the group;

program instructions to receive, over a data network, from a home-automation enabled appliance, an inventory of available items currently stored at a location of the home-automation enable appliance;

program instructions to compare the list of items needed with the inventory;

program instructions to produce a second list of items to be procured for the social event, wherein an item in the second list exists in the list of items needed but not in the inventory;

program instructions to connect to a music subscription service; and program instructions to send instructions to the music subscription service to create a customized playlist based on the aggregated preference and schedule a playback of the customized playlist from the music subscription service, wherein the aggregated preference includes a music style preference having a highest confidence rating among music style preferences of the invitees.

* * * * *